Nov. 14, 1950      H. J. SATSKY      2,530,341
LOADING AND UNLOADING ELEVATOR PLATFORM FOR VEHICLES
Filed Oct. 11, 1946      3 Sheets-Sheet 3
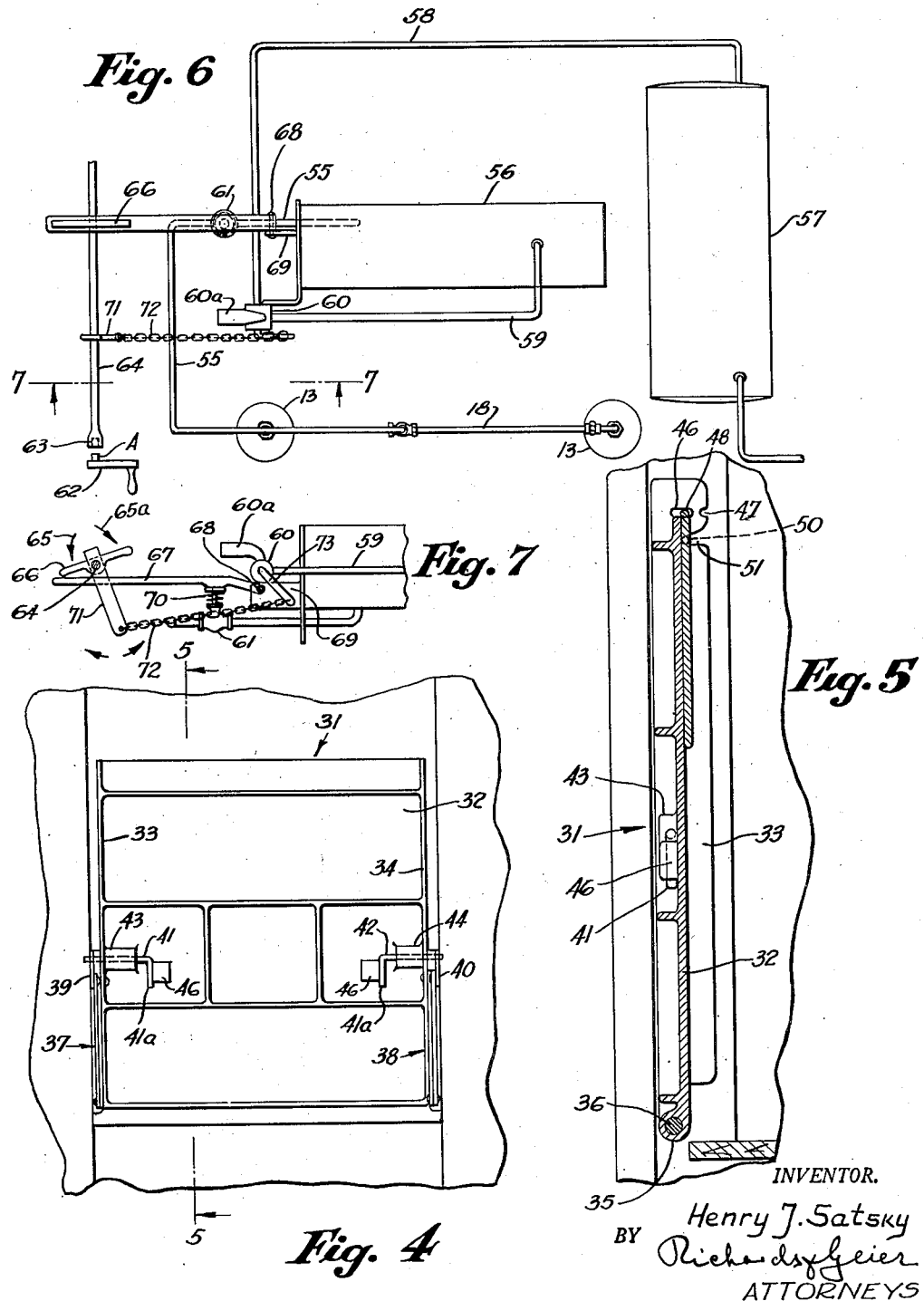
INVENTOR.
Henry J. Satsky
BY Richard J. Geier
ATTORNEYS Patented Nov. 14, 1950

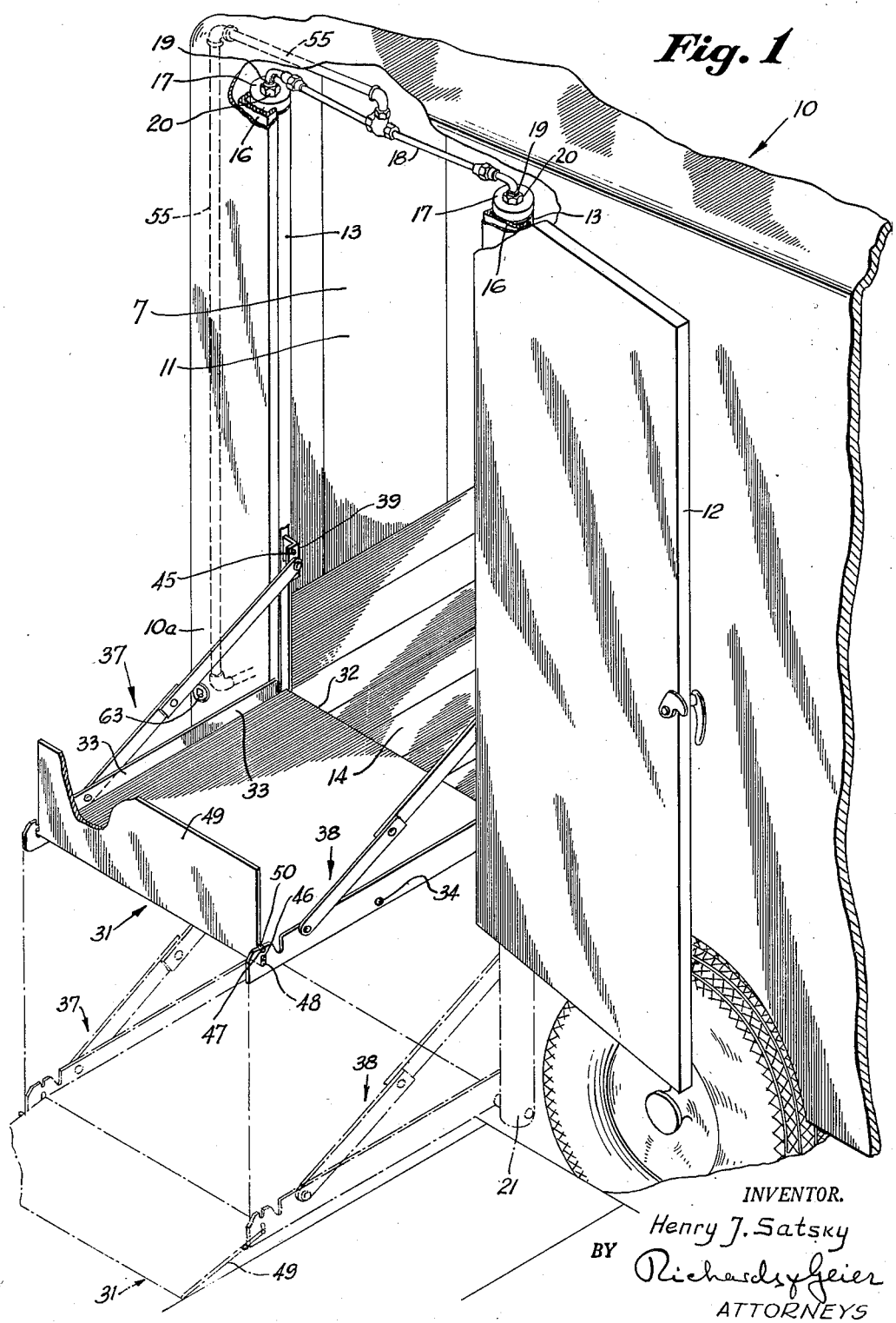

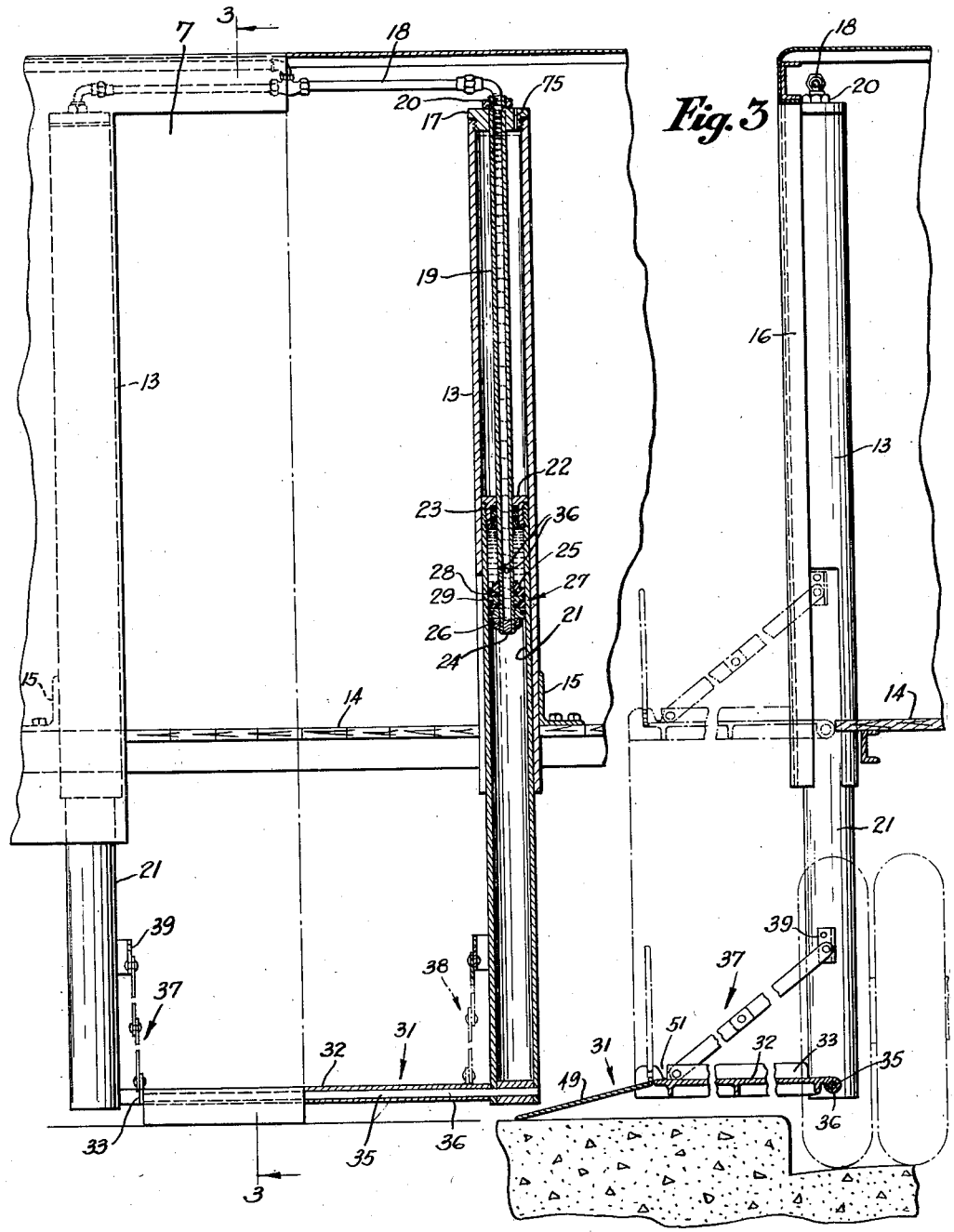

2,530,341

UNITED STATES PATENT OFFICE 2,530,341

LOADING AND UNLOADING ELEVATOR PLATFORM FOR VEHICLES

Henry J. Satsky, Newark, N. J.

Application October 11, 1946, Serial No. 702,780

4 Claims. (Cl. 214—75)

This invention relates to loading and/or unloading platforms, and more particularly to such platforms used in combination with automotive vehicles or trucks and operated from the hydraulic brake system of said vehicles.

One object of the invention is to provide an automotive vehicle or truck with a hydraulically operated platform, the use of which will greatly enhance the loading and unloading of said vehicle.

Another object of the invention is to provide such a platform which when not in use may be folded in inoperative position in or at the doorway of the vehicle, from which position it may readily be unfolded for use and, when loaded or otherwise, lowered to any desired position between the level of the truck floor and sidewalk or other level.

Still another object is to provide means for easily lifting and lowering said platform.

A further object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawings, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

In carrying out the objects of the present invention, it was found advantageous to provide a pair of spaced apart cylinders in each of which there is slidably mounted a piston to the lower end of which there is pivotally secured one side of a platform foldable between said pistons when not in use. It was further found advantageous to connect the said cylinders with the hydraulic system of the vehicle and provide simple means for operating said platform for up and down movement.

The construction and operation of the invention will appear more clearly from the following specification when taken in connection with the accompanying drawings, wherein:

Figure 1 is a fragmental perspective view of a motor truck showing the platform of the present invention as applied thereto;

Figure 2 is a part elevational and part sectional view of the device looking from the left of Figure 1 with the platform in lowermost or sidewalk position;

Figure 3 is a sectional view taken on line 3—3 of Figure 2;

Figure 4 is a fragmental elevational view showing the platform in folded inoperative position;

Figure 5 is a sectional view at an enlarged scale taken along line 5—5 of Figure 4;

Figure 6 is a diagrammatic view of the hydraulic operating system, and

Figure 7 is a detail view of the oil and air valve operating means.

Referring now to the drawings in detail, the numeral 10 indicates a motor truck which may be provided at the side thereof with a doorway 11 closed by a door 12. Positioned at or near the doorway 11 are a pair of spaced apart cylinders 13 secured to the floor 14 of the truck by means of suitable brackets 15. In addition to the brackets 15 channels 16 may be secured to the sides of the truck for bolstering the said cylinders 13. The cylinders 13 are closed at the top by screw-threaded caps 17.

A pipe line 18 at the top of the cylinders enters or connects at each end thereof vertical tubes 19 secured to the caps 17 by nuts 20. The tubes 19 pass through the cylinders 13 and enter into the interior of hollow cylindrical pistons 21. The said cylindrical pistons are each closed at the top by a screw cap or gland 22 through which the tube 19 passes, the said gland having suitable packing 23 therein to make a liquid tight joint where the tube 19 passes through the gland 22. The bottom of the tubes 19 are each closed by a plug 24 and are provided with external threads for the reception of a pair of nuts 25—26 between which is supported a piston formation 27 comprising suitable rings 28 and 29, the said tubes being provided above said piston rings with openings or orifices 30.

A loading platform 31 is pivotally and foldably supported on and between the cylindrical pistons 21. The said platform 31 comprises a base 32 having lateral flanges 33 and 34. The said base terminates at the rear thereof in a tubular hinge portion 35 pivotally supported on a hinge pin or rod 36 supported at the bottom of the cylindrical pistons 21 (see Figs. 2 and 3). The platform 31 is supported at the front of its sides by means of pivoted pairs of links 37 and 38. The links 37 are pivotally connected at one end to the flange 33 and at the opposite end to a bracket 39, and the pivotal links 38 are similarly connected to the flange 34 and to a bracket 40 similar to bracket 39. The brackets 39 and 40 are secured to the side edges defining the doorway. When in the folded position shown in Figures 4 and 5, the platform may be bolted or releasably locked in position by means of identical bolts 41 and 42 which pass through respective ears or lugs 43 and 44 on the underside of the platform base 32 and through holes 45 in the respective brackets 39 and 40. When in locked position the bolts are prevented from disengagement by means of rubber blocks 46 on the said base 32, one at the rear of each bolt.

The side flanges 33 and 34 are each provided near their outer or forward ends with a slot 46 and a notch 47. The slots 46 are for the purpose of receiving trunnions 48 which act as pivots for an auxiliary base board 49 and the notches 47 are provided for the reception of latching projections or pins 50 on the side edges of the board 49 for releasably maintaining the said board perpendicular to the base 32, as shown in Figure 1. In the Figure 5 position, the auxiliary base board 49 is shown as having been pulled up in the slot 46 until the projections 50 are out of engagement with the notches 47 and the board has been revolved until it is flat against the base 32 and the projections or pins 50 are in clearance slots 51 provided for this purpose in the flanges 33 and 34.

It will be seen from the drawings that the platform is so supported that when in folded position it is clear of the doorway side edges and will in no way interfere with the closing of the truck door 12.

To swing the platform 31 into the loading or unloading position shown in Figure 1, the bolts 41 are revolved until the depending portions 41a are out of engagement with the blocks 46 and are then withdrawn from locking engagement with the brackets 39 and 40, at which time the platform is free to be swung outwardly or unfolded as shown in said Figure 1. The auxiliary board 49 is then swung out of its folded Figure 5 position and latched in position as shown. In the full line Figure 5 position the auxiliary board is used as an inclined plane or ramp to enhance the loading or unloading of the platform.

The cylinder and piston arrangement 13 and 21 may be connected to the hydraulic system used to operate the brakes of the vehicle. This may be accomplished by means of a pipe line 55 which branches off the pipe line 18 and extends to the oil tank 56, and by connecting the air tank 57 of the hydraulic system to the oil tank 56 by means of a pipe line 58—59 and an air valve 60 in the said line 58—59. An oil valve 61 is provided in the oil pipe line 55.

It is to be understood that when the platform 31 and hollow pistons 21 are in the upper or full line Figure 1 position, the inner bores of the said pistons 21 are full of oil between the piston formation 27 and gland 22. If now it is desired to lower the platform from the full line Figure 1 position to the dotted or lower Figure 1 or full line Figure 3 position, an angular projection A of a key or handle 62 is inserted into a depression 63 of a shaft 64 journalled in the side walls of the truck or vehicle 10, the said open end of the shaft protruding through the truck wall 10a (see Fig. 1). By turning the key to the left or in the direction of arrow 65, a crank 66 will depress a lever 67 pivoted at 68 on a bracket 69 and depress the spring controlled stem 70 of the oil valve 61 to open same to permit the oil in the cylindrical piston to return to the oil tank 56. It will be understood that with the oil valve 61 open, the weight of the platform either alone or with its contents will cause the pistons 21 to move down and force the oil therein to pass through openings 30 up into the tubes 19 and out through pipe lines 18 and 55 into the tank 56. Any air in the tank will be displaced by the said oil and forced out through the line 59 and exhaust outlet 60a of the air valve 60.

To move the platform upwardly from its lowered position, the shaft 64 is rotated towards the right or in the direction of arrow 65a of Fig. 7. The turning of the shaft towards the right opens the oil valve 61 as before and also opens the air valve 60 by means of the lever arm 71 on shaft 64, chain 72 and air valve handle or lever arm 73, to admit air into the oil tank 56 and force the oil therein to flow through pipe lines 55—18 down through tubes 19, through holes 30 and into cylindrical pistons 21 and force same up. When the platform is at its desired level the valves are shut off by rotating the shaft from right to left to normal position.

An air vent 75 is provided in each of the caps 17 to permit the escape of air from the cylinders 13 as the cylindrical pistons 21 move upwardly in said cylinders.

From the foregoing it will be seen that the present invention provides means whereby the loading or unloading of trucks is greatly facilitated and expedited.

It is apparent that the specific construction shown above has been given by way of illustration and not by way of limitation, and that the structure above described is subject to wide variation and modification without departing from the scope or intent of the invention, all of which variations and modifications are to be included within the scope of the present invention.

What is claimed is:

1. In a hydraulic system including a liquid tank under air pressure control, a device of the nature described, said device comprising a pair of spaced apart vertically disposed cylinders, a slidable hollow cylindrical piston in each of said cylinders, a pipe line connected to the liquid tank and the interior of the hollow pistons, means for controlling the flow of liquid under pressure from the liquid tank to the hollow pistons and back to the tank for moving said hollow pistons up and down in the said cylinders, said means comprising a normally closed liquid valve in the pipe line, a normally closed air valve in the pipe line, a rotatable shaft, a two arm lever on the shaft, a pivotally mounted lever arm on the liquid valve operable by one of the two arms of said lever when the shaft is rotated in one direction to open the liquid valve to permit the liquid to flow from the tank to the pistons and operable by the other arm of the said two armed lever when the shaft is rotated in the opposite direction to open the said liquid valve to permit the return of the liquid from the pistons to the tank, a second lever arm on the shaft, another lever arm on the air valve, a chain connecting the said last-mentioned lever arms to operate the air valve from closed to open position for putting the liquid under air pressure only when the liquid valve is operated to permit the flow of liquid to the pistons, and a loading platform carried by said hollow pistons.

2. In a vehicle having a doorway in one wall thereof, a device for facilitating the loading and unloading of goods from the floor of said truck to a sidewalk or vice versa, said device comprising a pair of spaced apart cylinders supported on said truck near said doorway, a piston vertically slidably mounted in each of said cylinders, means for operating said device for so sliding said pistons, a platform pivotally mounted at its rear end to the lower end of said pistons, foldable means pivotally secured to the sides of the platform near the front thereof and to the pistons above the platform pivot to adapt the platform to be folded and unfolded at said doorway, said parts being so arranged that when in unfolded position the said platform is flush with the floor of the truck when the pistons are in their upper position and near the sidewalk when the said pistons are in their lowermost position, a board pivoted at the front of the platform, and releasable latching means for maintaining said board in vertical position when the platform has been loaded, the said board being adapted to be swung outwardly when unlatched to form a ramp from the platform to the sidewalk when said platform is in its lowered position.

3. A device according to claim 2 wherein said board is also foldable against the top surface of the platform.

4. A device according to claim 2 wherein said board is also foldable against the top surface of the platform, and means for releasably locking said platform in folded position.

HENRY J. SATSKY.

REFERENCES CITED

The following references are of record in the file of this patent:

UNITED STATES PATENTS

| Number | Name | Date |
|---|---|---|
| 747,899 | Wall | Dec. 22, 1903 |
| 1,441,097 | Laughlin | Jan. 2, 1923 |
| 1,480,257 | Gerlinger | Jan. 8, 1924 |
| 2,200,436 | Van Blarcom et al. | May 14, 1940 |
| 2,336,808 | Simon | Dec. 14, 1943 |
| 2,405,054 | Pringle | July 30, 1946 |
| 2,418,494 | Anthony et al. | Apr. 8, 1947 |